Nov. 8, 1966 K. N. BURNS 3,284,767
APPARATUS FOR MAKING DYNAMIC CORRECTIONS TO SEISMOGRAMS
Original Filed April 30, 1959 5 Sheets-Sheet 1

Kay N. Burns
INVENTOR.

BY John D. Gassett
ATTORNEY

Kay N. Burns
INVENTOR.

BY John D. Gassett
ATTORNEY

Nov. 8, 1966   K. N. BURNS   3,284,767
APPARATUS FOR MAKING DYNAMIC CORRECTIONS TO SEISMOGRAMS
Original Filed April 30, 1959   5 Sheets-Sheet 3

Kay N. Burns
INVENTOR.

BY John D. Gassett
ATTORNEY

Kay N. Burns
INVENTOR.

BY John D. Gassett
ATTORNEY

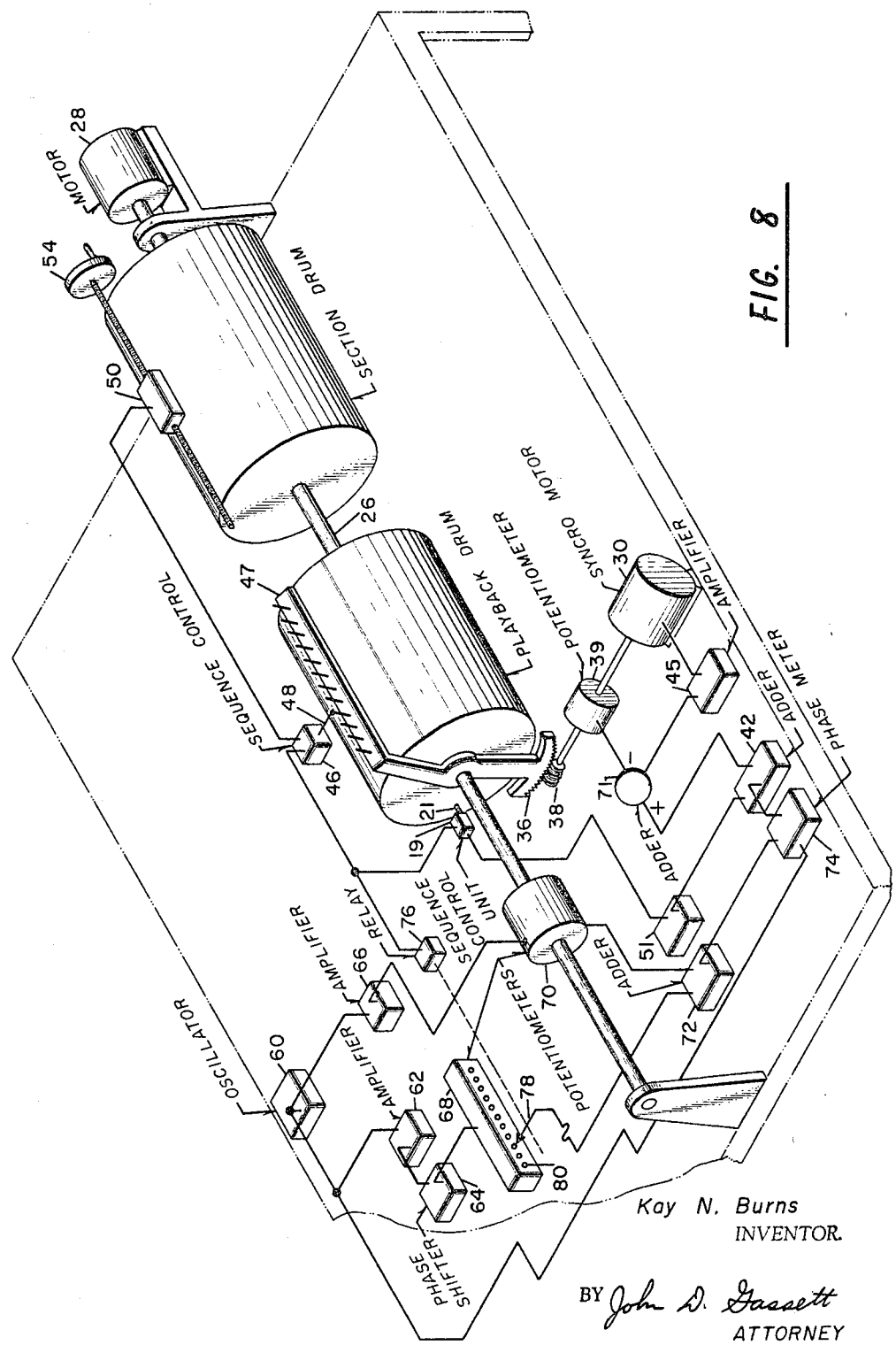

United States Patent Office 3,284,767
Patented Nov. 8, 1966

3,284,767
APPARATUS FOR MAKING DYNAMIC CORRECTIONS TO SEISMOGRAMS
Kay N. Burns, Tulsa, Okla., assignor, by mesne assignments, to Esso Production Research Company, Houston, Tex., a corporation of Delaware
Original application Apr. 30, 1959, Ser. No. 809,934, now Patent No. 3,134,958, dated May 26, 1964. Divided and this application Mar. 2, 1964, Ser. No. 348,625
5 Claims. (Cl. 340—15.5)

This application is a division of my copending application, Serial No. 809,934, filed April 30, 1959, now U.S. Patent 3,134,958.

This invention is broadly concerned with a system for correcting seismic records. More particularly, the invention is concerned with a system for preparing a corrected seismogram from uncorrected field records in which the corrections to the individual traces are entered automatically. The invention is especially adapted for use in conjunction with apparatus adapted to prepare a seismic section, preferably visual in character from one or more reproducible type seismograms. The invention enables seismic corrections to be automatically incorporated into a seismogram record as it is reproduced.

Geophysical prospecting procedures using artificially induced seismic disturbances have found wide application in the search for petroleum and other mineral deposits. In all of these methods, it is general practice to initiate an explosion or other seismic disturbance at a point near the surface of the earth and to direct seismic waves downward into the earth from that point. The waves continue to travel downward within the earth, until they encounter discontinuities in the earth's structure in the form of various substrata formations and the like. The discontinuities have the effect of reflecting at least a portion of the seismic waves back toward the surface of the earth. By arranging a plurality of geophones or other seismic transducers at spaced distances from the seismic disturbance points, it is possible to detect the arrival of the reflected seismic waves at the surface of the earth. Furthermore, by using accurate timing devices and recording means it is possible to determine not only the magnitude of the signals received by the various geophones, but also to measure the times required for the seismic waves to travel from the disturbance points down to the various discontinuities and thence to the geophones. By knowing this information and by measuring the distances between the various geophones from the seismic disturbance point, and by further measuring or assuming velocities of seismic waves in a particular section of the earth under study, it is possible to calculate and determine the depths of the various discontinuities beneath the surface of the earth.

In ascertaining the depth of subterranean strata or other seismic reflection events, it is necessary to make two general classes of corrections in the original seismic data. First, it is necessary to make certain "static" corrections which are static or fixed quantities for each seismic signal detected and recorded by a given geophone or transducer location. Corrections in this category compensate for such things as the height of a geophone relative to an assumed datum plane, the velocity of the seismic waves through a low velocity layer immediately adjacent the earth, the elevation of the disturbance or shot points relative to the datum plane, etc.

A second type of correction that must be made to the seismic records is the so-called "dynamic" or "variable" type in that the magnitude of the correction varies with time for the signals that are received by any given geophone or transducer location. This category of correction includes the "spread" or "stepout" correction which is a function of the distance of a geophone location from a shot point. It also includes any correction that is occasioned by variation in seismic velocity with depth in the section of the earth under study. It is with this "dynamic" correction that this invention is primarily concerned.

It is well to note that several terms in the following description are assumed to have the following meanings for the purposes of this description. Thus, the term reproducible seismogram is intended to mean a multi-trace reproducible recording of a plurality of geophone signals from a seismic observation. The term reproducible is intended to mean that the trace information may be translated into trains of electrical signals by scanning the trace with a suitable reproducing device means. For example, in the case of a magnetic type seismogram, a suitable reproducing or recording device would be a magnetic head.

The term recording medium or record medium in this description is intended to mean either a nonreproducible or a reproducible type record medium such as paper or photographic film, respectively adapted to receive seismic information.

The term seismic trace or channel is intended to mean the record formed on a record medium by reception of a train of signals from an individual geophone location. Each trace is, in effect, a record with time of the occurrence and magnitude of the signals received. It will be noted at this point that most seismic records are capable of recording simultaneously twenty or more trains of signals from as many geophone locations. In some instances, one geophone location may actually consist of a plurality of geophones connected together to form one signal.

The term seismic signal is intended to mean the electrical signal formed by a geophone or other seismic transducer in response to reception of seismic energy or waves. It is also intended to mean the electrical signals that are formed by reproducing the seismic trace from a reproducible record medium. It is further deemed to mean the pure seismic signal recovered from any carrier signal and the like.

The term seismic section shall be intended to mean a seismogram prepared from one or more field seismograms in which the individual seismic traces have been corrected for one or more seismic corrections. The individual traces that form a section are arranged in the same manner and order as the geophone location corresponding to traces; and the width of the traces are preferably proportional to the distances between the geophone locations so as to render the final product a reasonable accurate map or vertical cross section of the portion of the earth under study.

Recently, seismic recorders of a reproducible type have been developed; and these recorders are finding ever increasing application at the present time. Magnetic tape recorders are the most commonly used reproducible type seismic recorders. These recorders derive their name from the fact that they receive electrical signals from geophone locations and transform these signals into variable intensity traces which are reproducible in character. Thus, the recorders may be of a photographic type, in that they form traces of variable density or variable area characteristics. Alternatively they may develop variable intensity magnetic traces on a magnetic medium such as wire or tape or the like. In general, all reproducible recorders and traces are characterized in that the trace information may be scanned by a suitable transducer to generate trains of electrical signals in response to the trace information on a reproducible recording medium.

The equipment that is used to prepare a seismic section from a reproducible seismic record is popularly referred to as "playback" or "office playback" equipment, in that it plays back the information on the original records to generate the resulting seismic section. Manually operated adjustments on the equipment enable the operator thereof to incorporate both static and dynamic corrections for each signal trace on the original records, so that the section may be partially or completely corrected when completed.

It is an object of invention to provide a system for incorporating dynamic corrections in seismic records. It is still another object of the invention to develop a system having an output voltage proportional to the desired dynamic correction.

It is a more particular object of the invention to provide dynamic corrections in office playback equipment by means of synchros or servo motor control actuated by a spread correction voltage which has been generated by an analog means.

These and related objects which will be expressly described or readily apparent from the description that follows may be better understood by reference to the attached drawing in which:

FIG. 8 illustrates partially in perspective form, an apparatus for correcting seismic signals using the circuit shown in FIG. 5.

Figure 1:
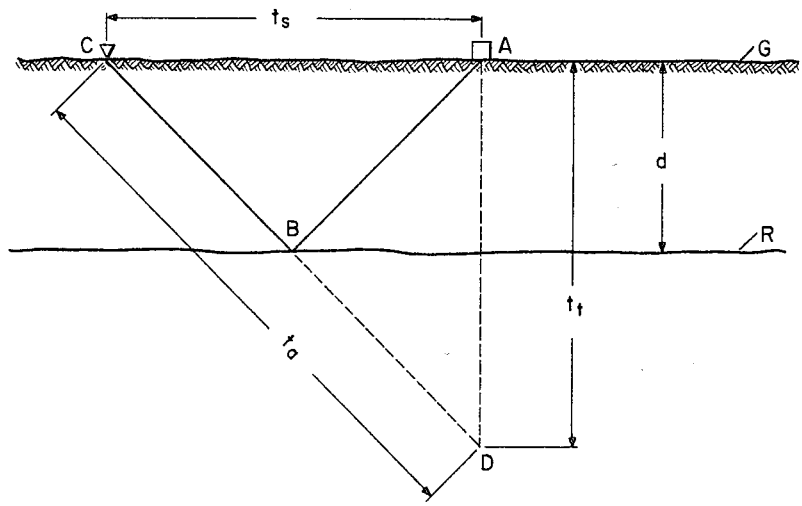
FIG. 1 is a schematic representation of a vertical section of earth along a selected profile showing the geometry involved in making spread corrections.

Referring first to FIG. 1, an explanation of the geometry of seismic spread correction is given. It is assumed that line G represents a selected portion of the surface of the earth with an explosive shot placed near the surface at point A. Seismic energy in traveling from the shot to the geophone as a reflected wave from a subsurface layer represented by line R at a depth $d$ takes a path A–B–C. The time of travel from the instant of detonation of the shot to the time that a reflection from subsurface R reaches point C is proportional to the distance A–B–C; whereas, the actual depth of interest is represented by $d$. D is the image of A with respect to line R. If a perpendicular line is drawn from point A to line R and the line A–B is "folded over" on line R, a large triangle A–D–C is obtained in which the distances of interest are more clearly presented. Thus, the distance A–B–C is the same as distance D–B–C, and the distance A–D is twice the distance $d$. In the triangle A–D–C, A–D which may be represented by $t_t$ is equivalent to the actual travel time of a reflected wave in traveling from point A to the reflected layer R, and is the distance a reflected wave would have traveled if the travel path were truly vertical. The distance A–C may be represented by $t_s$ and is representative of the time required for a wave to travel from A to C at the average velocity from A to B. The distance DC, which may be represented by $t_a$ is equivalent to the length of the actual travel time of a reflected wave in traveling from point A to the reflecting layer R and then to the geophone C. In terms of travel time, $t_a$ is the apparent travel time for a seismic pulse to travel from shot point A at the surface to the reflected bed and back to the surface; or in other words, $t_a$ is the actual travel time for the recorded event. It is desired to correct travel recorded time $t_a$ to equal the vertical time for a seismic pulse to go from shot point A at the surface to the reflector bed and back to the surface, or in other words, $t_t$ is the desired time to be recorded.

An analysis of the normally desired dynamic correction and its approximation follows. The normal correction $x$, is given in Equation (1).

(1) $$x = \sqrt{t_t^2 + t_s^2} - t_t$$

Figure 2:
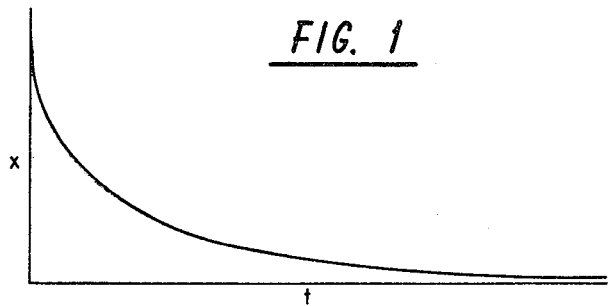
FIG. 2 illustrates graphically one curve for spread correction.

The curve of this equation is illustrated in FIG. 2. A brief development of Equation (1) follows.

(2) $$x = t_a - t_t$$

(3) $$t_a = \sqrt{t_t^2 + t_s^2}$$

A simple substitution of the value of $t_a$ in Equation (3) into Equation (2) gives the Equation (1). By multiplying the right hand side of Equation (1) by the term (4), Equation (5) is obtained.

(4) $$\frac{\sqrt{t_t^2 + t_s^2} + t_t}{\sqrt{t_t^2 + t_s^2} + t_t}$$

(5) $$x = \frac{t_s^2}{\sqrt{t_t^2 + t_s^2} + t_t}$$

where $t_t$ is great with respect to $t_s$ Equation 6 is a close approximation of the correction $x$.

(6) $$x = t_s^2 / 2 t_t$$

Figure 3:
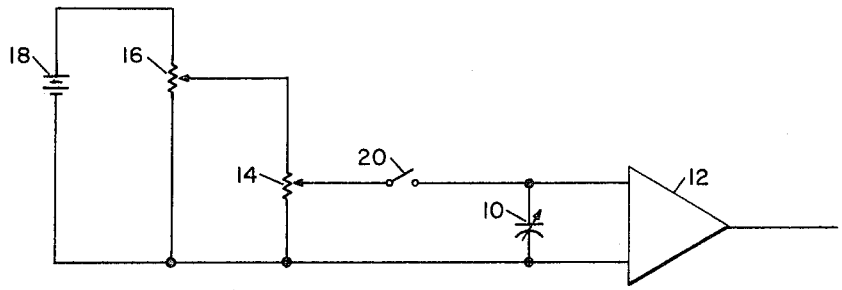
FIG. 3 illustrates an electrical circuit for generating a spread correction voltage.

An analogy of Equation (6) to a charged capacitor is then seen. In a charged capacitor, the voltage E is equal to $Q/C$ in which Q is the charge and C is the capacitance. In Equation (6) above, $t_s^2/2$ is known for each geophone location and is constant during the recording of a seismic signal. C then could be varied linearly to obtain a voltage proportional to $x$ at any time. Attention is now directed to FIG. 3 which illustrates an electrical circuit for obtaining a voltage proportional to $x$ as defined in Equation (6). It includes a revolving capacitor 10 and an isolating amplifier 12; capacitor 10 is connected across the amplifier input. It also includes a charging circuit which includes potentiometers 14 and 16, power source 18, and a switch 20 for completing the circuit between capacitor 10 and the charging circuit.

By closing switch 20, it is seen that capacitor 10 can be charged. This charge is determined by the power source 18 and the settings of potentiometers 14 and 16. Potentiometer 16 is set to correspond to the full spread of all geophone locations of the seismogram being corrected and potentiometer 14 is set to correspond to each trace individually as it is reproduced.

Capacitor 10 may take on various shapes. In a typical suitable capacitor, the conductor plates are semicircular and arranged to rotate with respect to each other with the area between the two plates, which form the capacitor, varying linearly as the plates rotate with respect to each other. During one revolution, the area between the plates goes from a maximum at the beginning to a minimum at one-half revolution to maximum at the end of the revolution. It is the first half revolution which is used in this particular embodiment of the invention. It is clear that the voltage E across capacitor 10 also varies in accordance with $E = Q/C$. If the rotation of the conductor plates with respect to each other is at a constant rate, then the voltage across condenser 10 will vary inversely. In other words, the voltage across capacitor 10 varies as correction $x$ in Equation (6).

Figure 4:
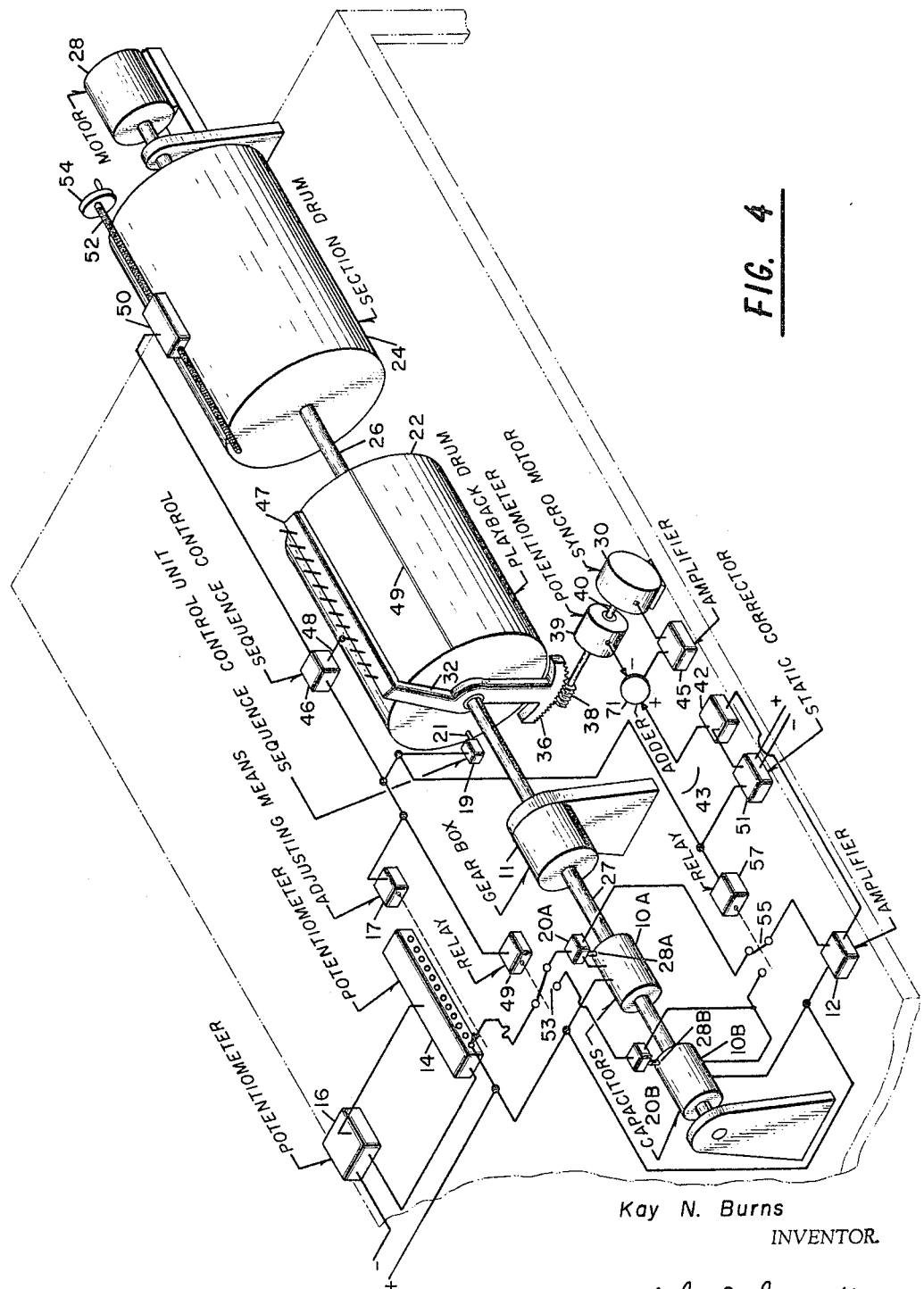
FIG. 4 illustrates, partially in perspective, the essential components for incorporating correction in a seismic record and reproducing same using an electrical circuit similar to that shown in FIG. 3.

Attention is now directed also to FIG. 4 for a fuller explanation of the circuits shown in FIG. 3 and how it is applied to make the spread correction $x$ of Equation (6). Gear box 11, magnetic playback drum 22, and section drum 24 are all mounted on shaft 26. A motor 28 is also mounted on shaft 26 and is used for driving in unison magnetic drum 22 and section drum 24. Gear box 11 is of a character that shaft 27 turns at one-half the speed of shaft 26. Capacitors 10A and 10B are mounted on shaft 27 and are similar to capacitor 10 described above in relation to FIG. 2. Capacitors 10A and 10B are 180° out of phase and are alternately used with each rotation of magnetic drum 22. In other words, the first-half revolutions of the capacitors are used with each revolution of magnetic drum 22. In that way, the voltage E across the capacitor during the time it is connected to the correcting circuit varies from a maximum to a minimum for each revolution of drum 22. The spread distance in time determines the setting of the potentiometers 16 and 14. This is assuming a constant velocity.

Potentiometer 16 is set to correspond to the full spread of the geophone locations of the seismogram being reproduced. Potentiometer 14 has a separate contact for each trace of the seismogram being reproduced.

A potentiometer adjuster means 17, which may be a stepwise advancing switch, advances the setting of potentiometer 14 to the next succeeding contact for each rotation of magnetic drum 22. A sequence control unit 19 actuated by cam 21 on the periphery of magnetic drum 22 once each revolution thereof, signals potentiometer adjuster means 17.

Magnetic drum or seismogram drum 22 is provided with a multihead reproducing means 47, each head being adapted to playback or reproduce one of the seismic traces on a seismogram. It will be noted in FIG. 4 that the ends of the seismogram tape on the drum come together at a line 49, and it will be further noted that all tapes, when mounted on the drum, are mounted in such a manner that the shallow recording portions of the tapes are reproduced before the deep portions.

Reproducing means 47 is connected electrically with the contact arm 48 which, in effect, is a pivoted contact arm adapted to contact separately each head of the reproducing means. Sequence control means 46 determines the order in which contact arm 48 contacts various traces on record drum 22. Signals received by the trace selector from the reproducing means are transmitted by suitable electrical circuit means to the recording head 50 on seismic section drum 24.

Head 47 not only serves the purpose of reproducing the seismic signal, but by properly positioning head 47 seismic corrections, both static and dynamic, can be incorporated therein. Arm 32 is pivotally supported by shaft 26. Arm 32 supports head 47 at one end adjacent the periphery of magnetic drum 22, and on the other end supports a worm gear segment 36 meshing with worm segment 38. Worm segment 38 is attached to rod 40 which is rotated by syncro motor 30. A position indicator potentiometer 39 is provided on rod 40. The output signal of potentiometer 39 is added at adder 71 to signal 43, which is the correction voltage across capacitor 10. The resulting signal from adder 71 is amplified by amplifier 45, whose output is connected to drive syncro motor 30.

Sequence control unit 19 also signals relays 49 and 57 and static program static correction means 51. Relays 49 and 57 operate switches 53 and 55, which alternately connects capacitor 10B and 10A with isolating amplifier 12 and potentiometers 14 and 16. For one revolution of magnetic drum 22 capacitor 10A is in the circuit and rotates one-half a revolution. The voltage across the capacitor goes from a maximum to a minimum. During the next succeeding revolution of magnetic drum 22, capacitor 10A rotates to where the area between the plate goes from a minimum area to a maximum area. During the next or even numbered revolution, capacitor 10B is in the circuit of amplifier 12. Capacitor 10B is 180 degrees out of phase with 10A; therefore, while capacitor 10A is going from a minimum voltage across itself to a maximum voltage, capacitor 10B is going from a maximum voltage to a minimum voltage across it. As shaft 27 is rotated at one-half of speed of shaft 26, it is seen that the proper rotational position of the plates of each capacitor 10A and 10B is used with each rotation of drum 22.

A programmed static correction means 51 is used to add a voltage $E_s$ to the output voltage of amplifier 12 corresponding to each position of each geophone. Static correction means 51 is also actuated by sequencing control unit 19. $E_s$ is constant for each geophone location.

The rotational position of shaft 40 is determined by the amplitude of the voltage of a signal fed to synchros motor 30. It is seen that the rotation of rod 40 back and forth causes head 47 to move back and forth along the periphery of drum 22 in relation to a neutral position when no directing signal is being fed to synchros motor 30. By suitably designing the gear ratios and relative positions in size and by calibrating or controlling the rotational movement of rod 40, it is possible to adjust the position of head 47 on any given seismic trace in terms of time displacement so as to incorporate time corrections within the trace.

By making the direction signal fed to syncro motor 30 represent the dynamic and static corrections required to be incorporated within a given trace, it is thus possible to incorporate both dynamic and static time corrections within the trace. As shown above the voltage across capacitor 10A or 10B, depending on which capacitor is in the circuit, varies according to the dynamic correction as one plate of the condenser is rotated with respect to the other plate. In the apparatus shown in FIG. 4, the voltage of capacitor 10A or 10B, as the case may be, varies in amplitude proportionally to the dynamic correction desired to be incorporated in the traces on magnetic drum 22. The voltage $E_s$ added at 42 represents a static correction factor for a particular seismic trace or which is proportional to the distance of the geophone location from the seismic shot. The directing signal thus fed to syncro motor 30 contains both dynamic and static corrections.

Recording means 50 moves longitudinally with respect to drum 24 along screw 52. It is desired that recording means 50 travel the length of screw 52 once for each section and stop at predetermined points corresponding to the relative positions of the geophone locations responsible for the various traces. Hand crank 54 may be used for manually moving the position of head or recording means 50. If desired, a programming means may be used to rotate screw 52 so as to automatically advance recording means 50 the desired distances between the recording of the successive traces.

It is thus seen that FIGS. 3 and 4 illustrate an electrical circuit and apparatus for introducing dynamic corrections into seismic tape playback equipment by means of servo motors. The output voltage of the electrical circuit illustrated in FIG. 3 is proportional to the desired time corrections. A static correction factor $E_s$ is introduced at 42 so that both the dynamic or variable and static corrections are introduced into the playback system. This voltage is used to direct a synchro motor to position a reproducing head with respect to the record of the trace being reproduced. The seismic signal recorded on drum 24 then is a corrected signal.

Normally, the approximation of the correction as indicated in Equation (6) is quite adequate for incorporating seismic corrections. However, if the relationship of $t_t$ compared to $t_s$ is such that $t_s$ cannot be ignored, the output voltage across capacitor 10A can be varied in accordance with Equation (1), which is illustrated in FIG. 2. This can conveniently be accomplished by shaping the plates on capacitor 10 to get the desired voltage function curve as the plates rotate with each other to approximate or coincide with the curve representing the correction as given by the correction Equation (1) and typically illustrated in FIG. 2.

Attention will now be directed to a system in which an arc tangent ($\tan^{-1}$) curve generator is used to develop a voltage proportional to spread correction. The general expression for spread correction is Equation (1), that is $x = \sqrt{t_t^2 + t_s^2} - t_t$. It will now be shown that Equation (8) is a close approximation to Equation (1).

(8) $$x^* = t_s(2/\pi) \tan^{-1}(\pi t_s/4t_t)$$

These two functions (1) and (8) may be expanded into a series and compared with the results being shown below:

(9)
$$x = \sqrt{t_t^2 + t_s^2} - t_t = t_s\left[0.5\frac{t_s}{t_t} - 0.125\frac{t_s^3}{t_t^3} + 0.0625\frac{t_s^5}{t_t^5} - 0.0391\frac{t_s^7}{t_t^7} + \ldots\right.$$

(10)
$$x^* = t_s\frac{2}{\pi}\tan^{-1}\frac{\pi t_s}{4t_t} = t_s\left[0.5\frac{t_s}{t_t} - 0.103\frac{t_s^3}{t_t^3} + 0.0382\frac{t_s^5}{t_t^5} - 0.0169\frac{t_s^7}{t_t^7} + \ldots\right.$$

The difference between $x$ and $x^*$ is

(11)
$$= t_s\left[0.022\frac{(t_s)^3}{(t_t)^3} - 0.024\frac{(t_s)^5}{(t_t)^5} + 0.023\frac{(t_s)^7}{(t_t)^7}\cdot\cdot\cdot\right.$$

For $t_s$ being greater than $t_t$ the correction is well within one percent so that for a spread of less than four thousand feed, the correction would be well approximated from 0.4 second on. A record normally represents about 6 seconds of recording. It is thus seen that if $4t_t$ is the horizontal component and $\pi t_s$ is the vertical component (which is 90° from $4t_t$) Equation (12) results.

(12) $$Q = \tan^{-1}(\pi t_s/4t_t)$$

The correction $x^*$ of Equation (8) can be generated by a phase meter comparing the addition of $\pi t_s$ and $4t_t$ at 90° phase relation with the standard phase.

Figure 5:
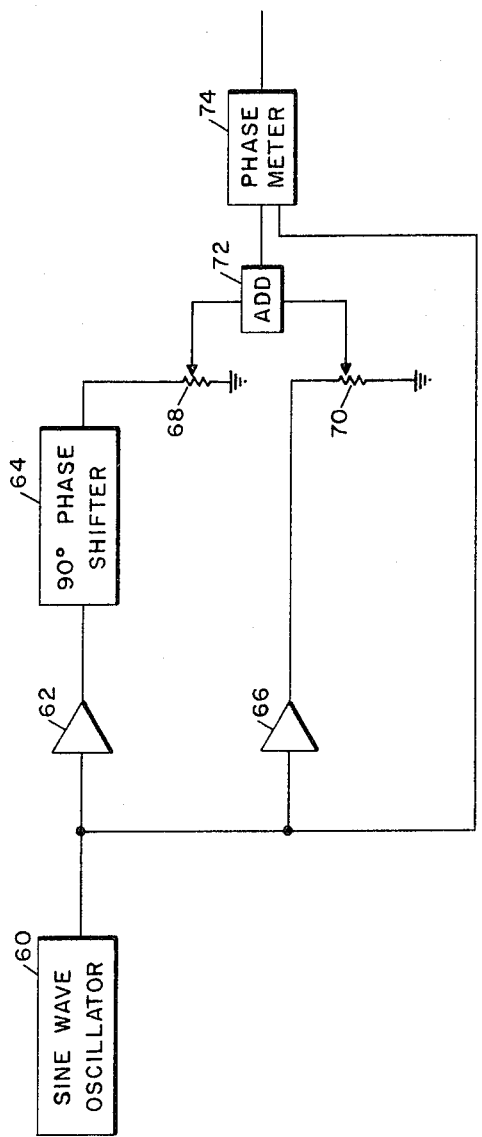
FIG. 5 illustrates an electrical circuit for another embodiment of the invention for generating a voltage proportional to spread corrections.

An electrical circuit for carrying out this generation is shown in FIG. 5. Since wave oscillator 60 generates a sine wave illustrated in curve A of FIG. 6. The frequency of the output of sine wave oscillator 60 is preferably at least about 1000 cycles per second. The output signal of oscillator 60 is fed to amplifier 62 which has $\pi$ amplification. The output of amplifier 62 is fed to phase shifter 64. The output of phase shifter 64 has the same frequency as the signal from the oscillator 60, except that it is 90° out of phase. This is illustrated in curve C of FIG. 6.

A potentiometer 68 receives the output of phase shifter 64 and incorporates a spread correction, that is the distance the geophone location for the seismic trace being corrected is from the seismic disturbance point. This correction is different for each geophone location, but is constant for the entire trace for each geophone location. In other words, potentiometer 68 multiplies the value of the output of phase shifter 64 by a factor representing the distance from the shot point to the geophone location whose signal is being processed. The output signal from potentiometer 68 is represented by curve C of FIG. 6.

The output of oscillator 60 is also fed to amplifier 66 which amplifies the signal of the oscillator by 4. The output signal of amplifier 66 is electrically connected to potentiometer 70.

Potentiometer 70 provides the correction for $t_t$ and varies linearly with the time of the trace being corrected. In other words, the function of potentiometer 70 is to multiply the output of amplifier 66 by the term $t_t$. This may be done conveniently by arranging the shaft of the sliders of potentiometer 70 so that it will rotate one revolution during the reproduction time of one seismic signal.

Figure 6:
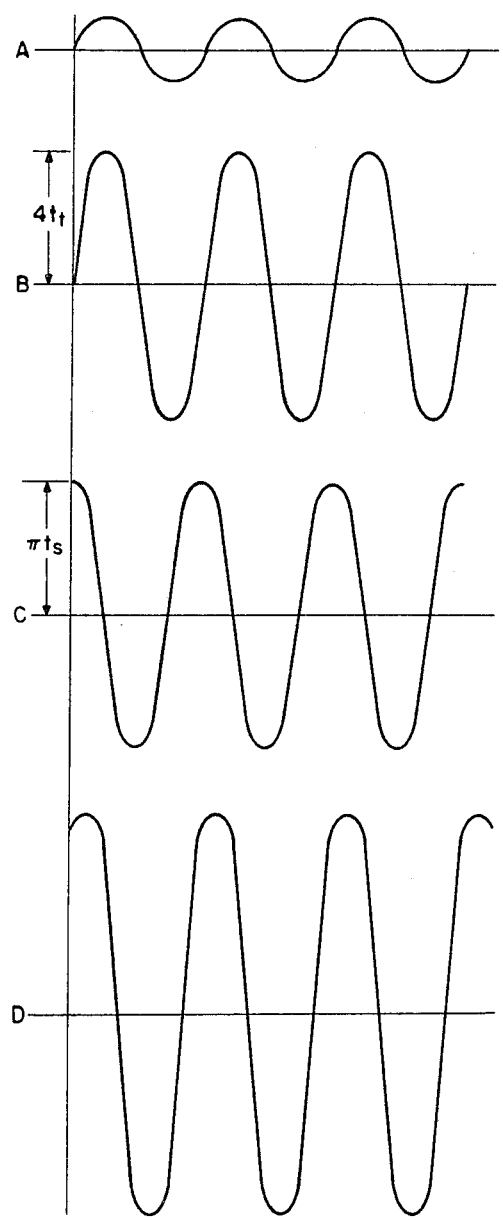
FIG. 6 illustrates electrical signals at different points in the apparatus shown in FIG. 5; and, FIG. 7 illustrates the voltage output curve of the apparatus described in FIG. 5.
Figure 7:
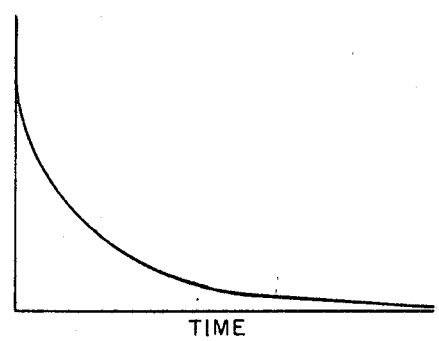

The output from potentiometers 70 and 68 which are represented by curves B and C respectively of FIG. 6, are added at adder 72. A suitable adder is shown in FIGURE 18–1 in Waveforms, by Chance, Hughes, MacNichol, Sayre and Williams and published by McGraw-Hill. The resulting electrical signal from adding means 72 is shown as curve D in FIG. 6. This signal is fed to phase meter 74. A suitable phase-sensitive detector is shown in FIGURE 14–21 of Waveforms supra. Also fed to phase meter 74 is the sine wave signal from oscillator 60 as represented by curve A in FIG. 6. Phase meter 74 detects the difference in phase between the signals represented by curves A and D of FIG. 6 and integrates the difference so that the output of phase meter 74 is proportional to the phase difference of the signals represented by curves A and D. This output signal is illustrated by the curve in FIG. 7.

FIG. 8 illustrates an apparatus for incorporating the seismic corrections circuit in FIG. 5 to a reproducing system. Sine wave generator 60, amplifier 66, amplifier 62, phase shifter 64, potentiometer 68, potentiometer 70, adder 72 and phase meter 74 perform the same function as described in relation to FIG. 5. It will be noted, however, that potentiometer 70 is mounted on the same shaft 26 as magnetic drum 22 and section drum 24.

It will be noted that a number of the components of FIG. 8 are similar to the components of FIG. 4 and function in the same manner. These parts are given the same reference numerals in both figures. These components include magnetic drum 22, section drum 24, motor 28, shaft 26, reproducing head 47, sequence switch 46, contact 48, potentiometer indicator 39, servo motor 30 and shaft 40, amplifier 45, adders 42 and 71, $E_s$ source 51, worm gear 36, worm 38, cam 21, sequence control unit 19, recording head 50 and hand crank 54.

Magnetic drum 22 has cam 21 on its periphery. Cam 21 is located at the end of each trace and is used to actuate sequence control unit 19. The signal from sequence control unit 19 is used to actuate relay 76 which drives switch 78 from one contact 80 to the next. These contacts 80 are arranged to compensate for the geophone location of the trace being reproduced. Switch 78 advances one contact for each revolution of drum 22.

The output signal from sequence control unit 19 also actuates program static correction 51 as previously described. $E_s$ the output of 51 is added at adder 42 with the output of phase meter 74. The resulting signal is then used to control servo motor 30 in the same manner as described in relation to FIG. 4. The resulting signal from adding means 42 incorporates the desired static correction $E_s$ and the spread or variable correction signal from phase meter 74. Head 47 then is adjusted in accordance with this combined correction signal so as to incorporate the corrections into the signal as it is being reproduced.

While there are above disclosed but a limited number of embodiments of the system of the invention herein presented, it is possible to produce still other embodiments without departing from the inventive concept herein disclosed, and it is desired therefore that only such limitations be imposed on the impending claims as are stated therein.

What is claimed is:

1. A system for reproducing and correcting seismic signals previously recorded on a reproducible record medium, comprising:

seismic trace reproducing means including a reproducing head for reproducing recorded traces as electrical signals and transport means for the reproducible record medium for operatively positioning the record medium relative to the reproducing head and for moving said medium relative to said head;

variable area capacitor means;

charging means for placing a charge on said capacitor means representative of distance of a seismic transducer from a seismic source;

means connected to said capacitor means for isolating said capacitor means from said charging means after it has been charged thereby;

means connected to said reproducing means for varying the area between the plates of said capacitor means in accordance with time as said reproducing head reproduces traces on said record medium; and means connected to said reproducing head and to said capacitor means for adjusting the relative position of said reproducing head with respect to the record medium transport means in accordance with variations in the voltage across said capacitor means.

2. A system for reproducing and correcting seismic signals previously recorded on a reproducible record medium, comprising:

seismic trace reproducing means including a reproducing head for reproducing recorded traces as electrical signals and transport means for the reproducible record medium for operatively positioning the record medium relative to the reproducing head and for moving said medium relative to said head;

an isolating amplifier;

variable area capacitor means connected across the input of said amplifier;

means connected to said capacitor means for placing a charge on said capacitor means representative of distance between a seismic source and a seismic transducer;

means connected to said capacitor means and to said reproducing means for varying the area between the plates of said capacitor means in accordance with time as the reproducing means moves relative to the reproducing head; and means connected to said amplifier for adjusting the relative position of the reproducing head with respect to the reproducible medium carried by said transport means in accordance with variations in the output voltage of said amplifier.

3. A system for reproducing and correcting seismic signals previously recorded on a reproducible record medium, comprising:

seismic trace reproducing means including a reproducing head for reproducing recorded traces as electrical signals and transport means for the reproducible record medium for operatively positioning the record medium relative to the reproducing head and for moving said medium relative to said head;

an isolating amplifier;

variable area capacitor means connected across the input of said isolating amplifier;

a charging circuit;

connecting means including switch means for selectively completing the circuit between said capacitor means and said charging circuit;

means connected to said reproducing means and to said capacitor means for linearly varying the area between the plates of said capacitor means; and means connected to the output of said amplifier and to said reproducing head for adjusting the relative position between said head and the record medium transport means carried by said reproducing means in accordance with variations in the output signal of said amplifier.

4. A system for reproducing and correcting seismic signals previously recorded on a reproducible record medium, comprising:

seismic trace reproducing means including a reproducing head for reproducing recorded traces as electrical signals and transport means for the reproducible record medium for operatively positioning the record medium relative to the reproducing head and for moving said medium relative to said head;

capacitor means having fixed plate means and movable plate means;

charging means for placing a charge on said capacitor means representative of $t_s/2$, where $t_s$ represents the travel time of a seismic wave from a seismic source to a geophone;

means connected to said capacitor means and to said charging means for isolating said capacitor means after it is charged by said charging means;

means connected to said capacitor means and to said trace reproducing means for moving said movable plate means relative to said fixed plate means as a function of relative movement between said reproducing head and said transport means; and means electrically coupled to said amplifier and to said reproducing head for adjusting the relative position of said head with respect to the reproducible medium carried by said transport means in accordance with variations in the voltage across said capacitor means.

5. A system for reproducing and correcting seismic signals previously recorded on a reproducible record medium, such seismic signals being obtained at geophone locations located at variable distances from a seismic source, comprising:

seismic trace reproducing means including a reproducing head for reproducing recorded traces as electrical signals and transport means for the reproducible record medium for operatively positioning the record medium relative to the reproducing head and for moving said medium relative to said head;

variable area capacitor means having movable plate means and fixed plate means;

first potentiometer means having a variable tap and being adjustable to correspond to the distance of the geophone locations farthest removed from the seismic source, one end terminal of said first potentiometer means being connected to a voltage source and the other terminal being connected to ground;

second potentiometer means having one terminal connected to the variable tap of said first potentiometer and the other terminal connected to ground, said second potentiometer means having an adjustable contact;

connecting means including switch means for connecting the adjustable contact of said second potentiometer means to one plate means of said variable area capacitor means;

means for varying the area between the plates of said capacitor means in accordance with movement of the record medium carried by said transport means relative to said reproducing head; and means for adjusting the relative position of said head with respect to the reproducible record medium carried by said transport means in accordance with variations in the voltage across said capacitor means.

References Cited by the Examiner

UNITED STATES PATENTS

| 2,230,502 | 2/1941 | Pearson | 340—18 |
| 2,752,567 | 6/1956 | Kinkel | 324—70 |
| 3,018,981 | 1/1962 | Weller | 244—14 |

OTHER REFERENCES

A.P.C. Application of Maillet, 254, 743, published May 18, 1943.

BENJAMIN A. BORCHELT, *Primary Examiner.*

R. M. SKOLNIK, *Assistant Examiner.*